(12) United States Patent
Miki et al.

(10) Patent No.: US 7,652,222 B2
(45) Date of Patent: Jan. 26, 2010

(54) ELECTRIC DISCHARGE MACHINE AND METHOD FOR OPTIMIZING MACHINING CONDITIONS OF THE ELECTRIC DISCHARGE MACHINE

(75) Inventors: Shinsuke Miki, Tokyo (JP); Hidetaka Katougi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 736 days.

(21) Appl. No.: 10/575,108

(22) PCT Filed: Jan. 24, 2005

(86) PCT No.: PCT/JP2005/000872

§ 371 (c)(1),
(2), (4) Date: Apr. 10, 2006

(87) PCT Pub. No.: WO2005/070599

PCT Pub. Date: Aug. 4, 2005

(65) Prior Publication Data

US 2008/0245780 A1  Oct. 9, 2008

(30) Foreign Application Priority Data

Jan. 26, 2004 (JP) .............................. 2004-017223

(51) Int. Cl.
*B23H 7/20* (2006.01)
(52) U.S. Cl. ............... 219/69.13; 219/69.14; 219/69.17
(58) Field of Classification Search .............. 219/69.13, 219/69.16, 69.14, 69.2, 69.17, 69.18; 700/162
See application file for complete search history.

(56) References Cited

U.S. PATENT DOCUMENTS

| 4,510,364 | A | * | 4/1985 | Ito | ........................... 219/69.16 |
| 5,336,863 | A | * | 8/1994 | Terui | ....................... 219/69.14 |

FOREIGN PATENT DOCUMENTS

| JP | 61-30334 A | * | 2/1986 |
| JP | 62-287913 | | 12/1987 |
| JP | 62-287914 | | 12/1987 |
| JP | 62-287923 | | 12/1987 |
| JP | 64-45521 A | * | 2/1989 |
| JP | 1-210219 | | 8/1989 |
| JP | 6-262435 | | 9/1994 |
| JP | 3519149 | | 2/2004 |
| JP | 2005-103709 | | 4/2005 |

* cited by examiner

*Primary Examiner*—Geoffrey S Evans
(74) *Attorney, Agent, or Firm*—Oblon, Spivak, McClelland, Maier & Neustadt, L.L.P.

(57) ABSTRACT

A discharge voltage detecting unit of an electric discharge machine detects a discharge voltage and determines an average discharge voltage in a specified period of time. An optimum machining condition computing unit determines a discharge current that makes an average discharge voltage detected by a discharge voltage detecting unit equal to an average discharge voltage when a new machining liquid is used. The optimum machining condition computing unit determines an optimal discharging time, an optimal non-operating time, and an optimal servo reference voltage from relational equations depending on the determined discharge current. A machining condition data base storing unit stores the discharge current, the discharging time, the non-operating time, and the servo reference voltage. A servo control unit establishes the optimum machining conditions at the time of machining.

4 Claims, 3 Drawing Sheets

A : new machining liquid
A(degraded machining liquid) : used for three years
C : new machining liquid
C(degraded machining liquid) : used for one year A : new machining liquid
A(degraded machining liquid) : used for three years
C : new machining liquid
C(degraded machining liquid) : used for one year (a) Normal electric discharge (b) Abnormal electric discharge Vg : no-load voltage  
ON : discharging time  
Td : no-load discharging time  
OFF : non-operating time  
eg : discharge voltage  
SV : servo reference voltage

ELECTRIC DISCHARGE MACHINE AND METHOD FOR OPTIMIZING MACHINING CONDITIONS OF THE ELECTRIC DISCHARGE MACHINE

TECHNICAL FIELD

The present invention relates to an electric discharge machine in which an object to be machined (object of machining) and a machining electrode are opposed to each other with a small machining gap, and in which a pulse-shaped voltage is applied over the machining gap between the object to be machined and the machining electrode to machine the object, and in particular, to such a method for optimizing machining conditions of an electric discharge machine that automatically optimizes machining conditions corresponding to a change in the properties of a machining liquid.

BACKGROUND ART

In general, in electric discharge machining, metal chippings, water, carboxylic acid, and the like, which are caused by electric discharge, degrade a machining liquid and reduces the volume resistivity of machining liquid. When this reduced volume resistivity causes abnormal electric discharge to pass an arc current, there are presented problems of decreasing machining speed and altering the quality of machined surface of an object to be machined.

To avoid this abnormal electric discharge, there is proposed a conventional electric discharge machining method for monitoring voltage across a machining gap and providing a servo reference value of setting a machining gap capable of developing normal electric discharge by servo control when a voltage across a machining gap is diverged from a reference value (for example, refer to patent document 1).

[Patent document 1] JP-A-06-262435 (Pages 2 to 4, FIGS. 1 and 5)

Because the conventional electric discharge machining method is constructed in the manner described above, abnormal electric discharge can be avoided but machining conditions such as discharging time and non-operating time are not optimized, so that sufficient machining characteristics cannot be obtained. In general, it is required that the electric discharge machine satisfies at least three machining characteristics of machining speed, reduced consumption of a machining electrode, and work surface quality. However, the conventional electric discharge machining method is an electric discharge machining method for mainly avoiding work surface quality from being degraded by abnormal electric discharge and hence presents problems that other characteristics (machining speed and reduced consumption of a machining electrode) are not sufficient.

This invention has been made to solve the above problems. The object of the invention is to provide such a method for optimizing machining conditions of an electric discharge machine that can not only avoid work surface quality from being degraded by abnormal electric discharge but also satisfy machining speed and reduced consumption of a machining electrode regardless of the kind and the degree of degradation of a machining liquid.

DISCLOSURE OF THE INVENTION

According to this invention, there is provided such a method for optimizing machining conditions of an electric discharge machine that includes the steps of: detecting an average discharge voltage in a specified period of time at the time of electric discharge machining; determining a discharge current that makes a discharge voltage detected by the step of detecting an average discharge voltage equal to a discharge voltage when an new machining liquid is used from a relationship between the discharge voltage when the new machining liquid is used, volume resistivity and discharge current of the new machining liquid; and determining discharging time, non-operating time, and a servo reference voltage depending on a discharge current determined by the step of determining a discharge current from such a relationship between a discharge current, discharging time, non-operating time, and a servo reference voltage that establishes optimum machining conditions.

In this manner, it is possible to determine such optimum machining conditions of discharging time, non-operating time, and a servo reference voltage that depend on the properties of a machining liquid. Then, the machining of a work under the determined optimum machining conditions can produce the effect of always providing the highest machining characteristics of not only avoiding deterioration of the quality of a work surface due to abnormal electric discharge but also satisfying machining speed and reduced consumption of a machining electrode regardless of the kind and the degree of degradation of the machining liquid.

BEST MODE FOR CARRYING OUT THE INVENTION

Hereinafter, to describe this invention in more detail, a best mode for carrying out this invention will be described with reference to the accompanying drawings.

Embodiment 1

Figure 1:
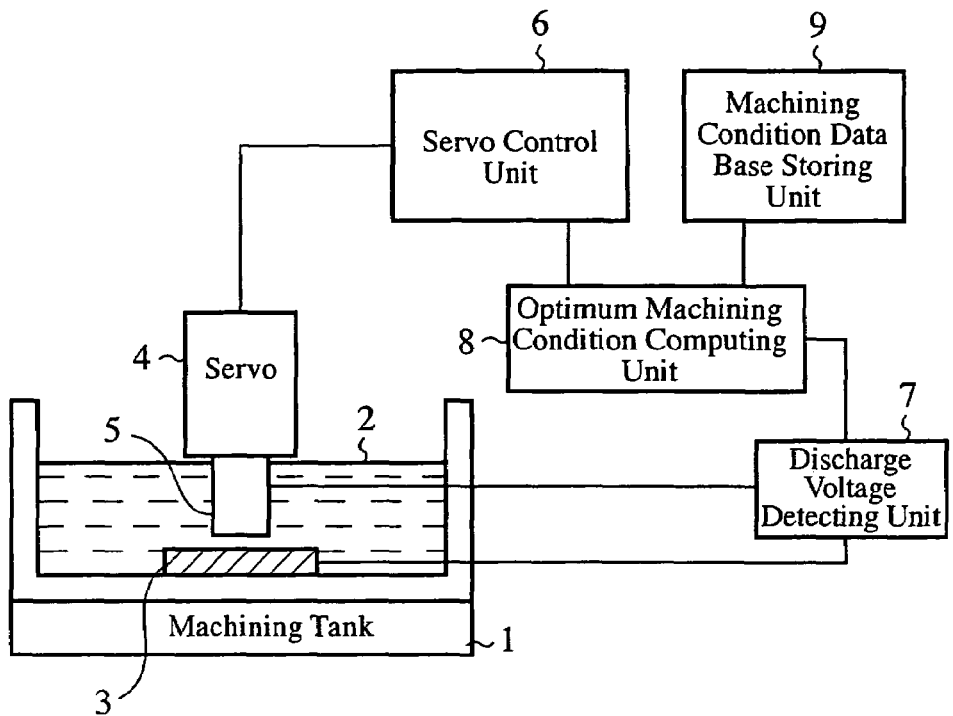
FIG. 1 is a diagram showing an electric discharge machine in accordance with embodiment 1 of this invention.

FIG. 1 is a construction diagram showing an electric discharge machine in accordance with embodiment 1 of this invention. In FIG. 1, a machining tank 1 is filled with a machining liquid 2 of i-paraffin-based hydrocarbon or the like and a work (object to be machined) 3 is placed in the machining tank 1. A machining electrode 5 is put on the tip of a servo or servo mechanism 4 and a gap between the machining electrode 5 and the work 3 is controlled by a servo reference voltage produced by a servo control unit 6 and when voltage is applied to the machining electrode 5, electric discharge develops across the machining electrode 5 and the work 3 via the machining liquid 2 to machine the work 3.

A discharge voltage detecting unit 7 detects that discharge voltage and finds an average discharge voltage in a specified period of time. An optimum machining condition computing unit 8 finds a discharge current that makes the average discharge voltage detected by the discharge voltage detecting unit 7 equal to an average discharge voltage when a new machining liquid is used from the relational equations of an average discharge voltage, volume resistivity, a discharge current, and a machining gap; and finds discharging time, non-operating time, and a servo reference voltage depending on the found discharge current from the relational equations with a discharge current, discharging time, non-operating time, and a servo reference voltage, which are stored in a machining condition data base storing unit 9 and provide an optimum machining condition; and controls the servo 4 and the machining electrode 5 under the optimum machining conditions through a servo control unit 6 at the time of machining.

The operation will next be described below.

A machining liquid used in the embodiment 1 is to be used for an electric discharge machine, in particular, an electric discharge machine for die-sinking. Performance required for the electric discharge machine for die-sinking includes seven points described below:

(1) Low in viscosity and easily ejecting machined chippings, tar, and the like from an electric discharge gap;
(2) Excellent in electric insulation;
(3) Excellent in cooling capability:
(4) Low in smell and not making a worker feel unpleasant;
(5) High in ignition point and boiling point;
(6) Chemically stable and not to release toxic gas; and
(7) No corroding an electric discharge machine and a work.

A machining liquid of hydrocarbon-based compound having low viscosity or a machining liquid produced by adding an oxidization inhibiting agent, a cooling capability enhancing agent, and the like to the hydrocarbon-based compound having low viscosity has been commonly used in consideration of these performance. The machining liquid is degraded thermally or degraded due to oxidization by electric discharge energy to produce decomposed substance, polymerized substance, fatty acid, fatty acid metallic salt, and the like, thereby being changed in properties in response to operating time.

Machining conditions are commonly set in consideration of properties such as volume resistivity and viscosity of a new machining liquid. Therefore, when the machining liquid is degraded to reduce volume resistivity, it does not recover insulation sufficiently and hence develops concentrative electric discharge to cause a stain (black point) or the like to thereby reduce machining characteristics, which results in being unable to provide initial machining characteristics. Therefore, it is important to provide sufficient machining characteristics regardless of the kind and the degree of degradation of the machining liquid.

Figure 2:
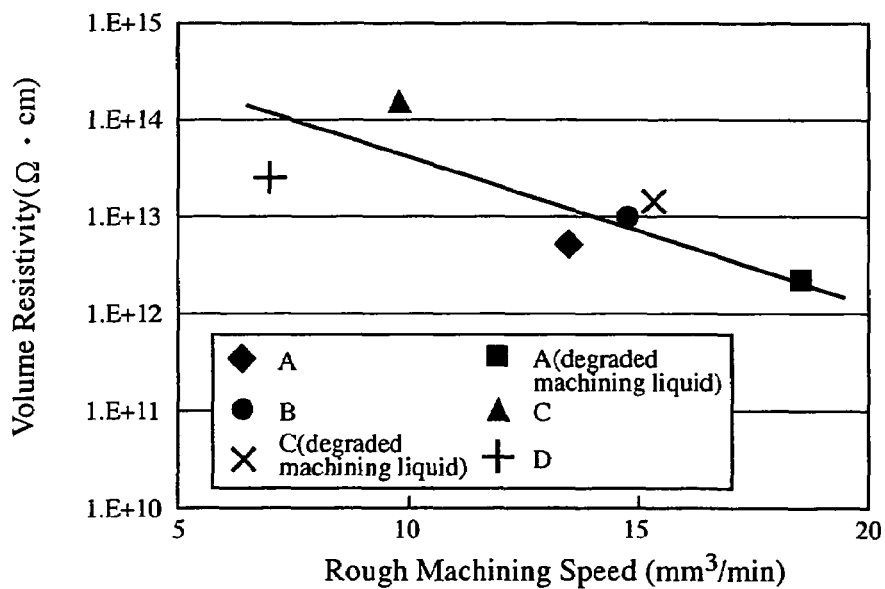
FIG. 2 is a characteristic graph showing a relationship between rough machining speed and volume resistivity.
Figure 3:
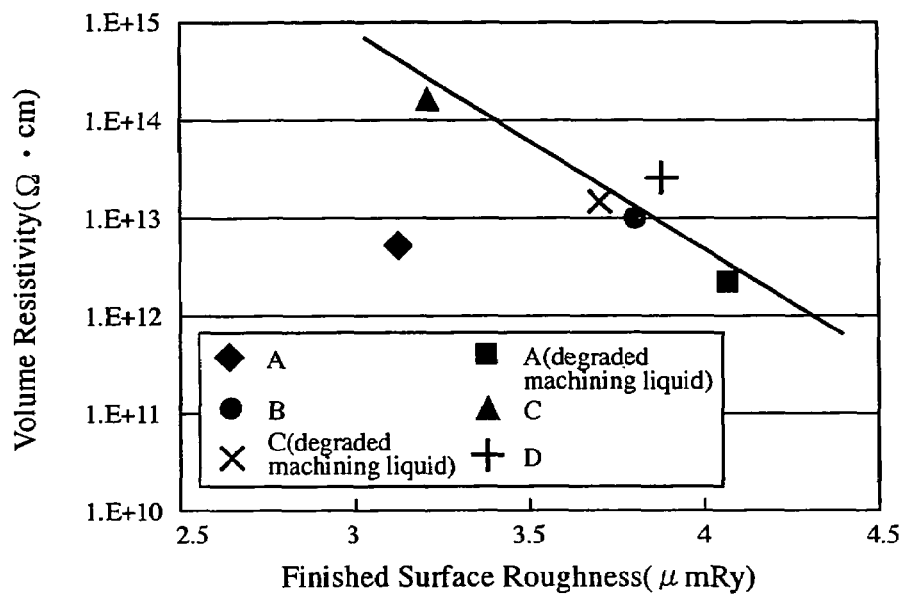
FIG. 3 is a characteristic graph showing a relationship between finished surface roughness and volume resistivity.

FIG. 2 is a characteristic graph showing a relationship between rough machining speed and volume resistivity and FIG. 3 is a characteristic graph showing a relationship between finished surface roughness and volume resistivity. These characteristics are the results that the inventors of this invention obtained by carrying out the detailed analysis and evaluation of machining liquid properties and machining characteristics (machining speed and finished surface roughness of a work after machining) in relation to a new liquid and a used liquid for the electric discharge machining of die-sinking.

As is clearly shown in FIG. 2, as the machining liquid is degraded, volume resistivity is decreased but rough machining speed is contrarily increased. For example, when volume resistivity is decreased from 1.E+14 to 1.E+13, rough machining speed is increased by approximately 1.6 times. It is thought that this is because the machining liquid is degraded thermally or degraded due to oxidization by electric discharge energy to produce decomposed substance, polymerized substance, fatty acid, fatty acid metallic salt, and machined chippings (metal powder), thereby being decreased in volume resistivity. Further, it is thought that this is because the capability of passing current is enhanced at this time in terms of electric discharge to shorten the time that elapses until a dielectric breakdown occurs to thereby increase machining speed.

Moreover, as shown in FIG. 3, it is clear that when volume resistivity is decreased, finished surface roughness is degraded. It is thought that this is because when the machining liquid is degraded to reduce volume resistivity, the machining liquid does not recover insulation sufficiently and hence develops concentrative electric discharge to cause a stain (black point) or the like, whereby the quality of a machined surface is declined and surface roughness is degraded.

In this manner, because the volume resistivity of machining liquid is changed by the kind and the degree of degradation of machining liquid, even if a work is machined under the same machining conditions, the same machining characteristics cannot be obtained if the volume resistivity of machining liquid is changed. Therefore, it is necessary to change machining conditions according to the volume resistivity of machining liquid so as to produce machining characteristics to be required. For example, a degraded machining liquid having its volume resistivity degraded is slow in recovering insulation as compared with a new machining liquid and hence develops concentrative electric discharge. Therefore, for the degraded machining liquid to produce the same machining characteristics as the new machining liquid, it is necessary to machine a work under the optimum machining conditions depending on the volume resistivity of machining liquid at that time.

Figure 4:
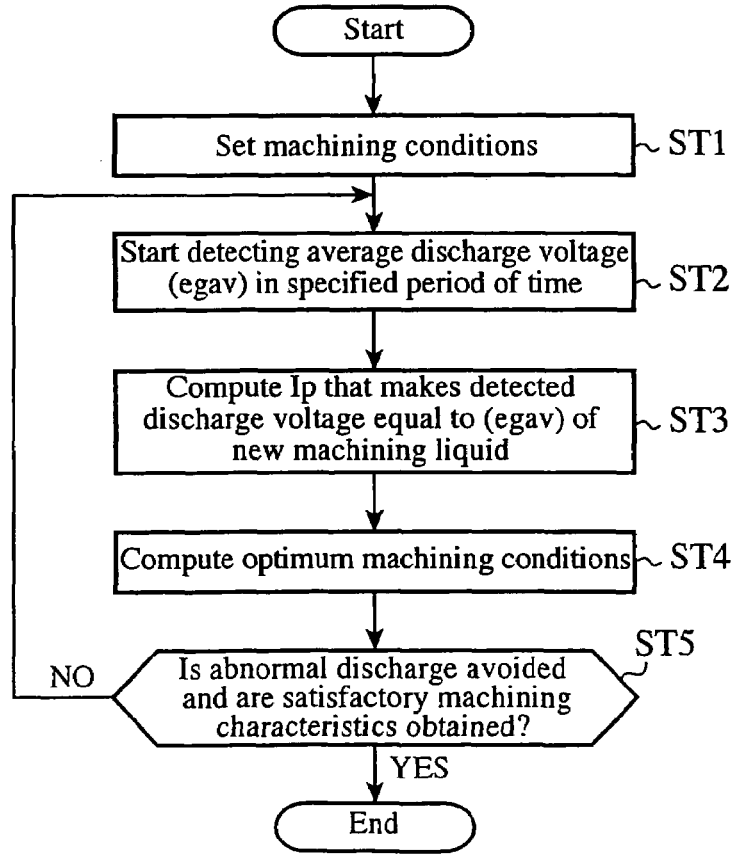
FIG. 4 is a flow chart showing a method for optimizing machining conditions of an electric discharge machine in accordance with the embodiment 1 of this invention.
Figure 5:
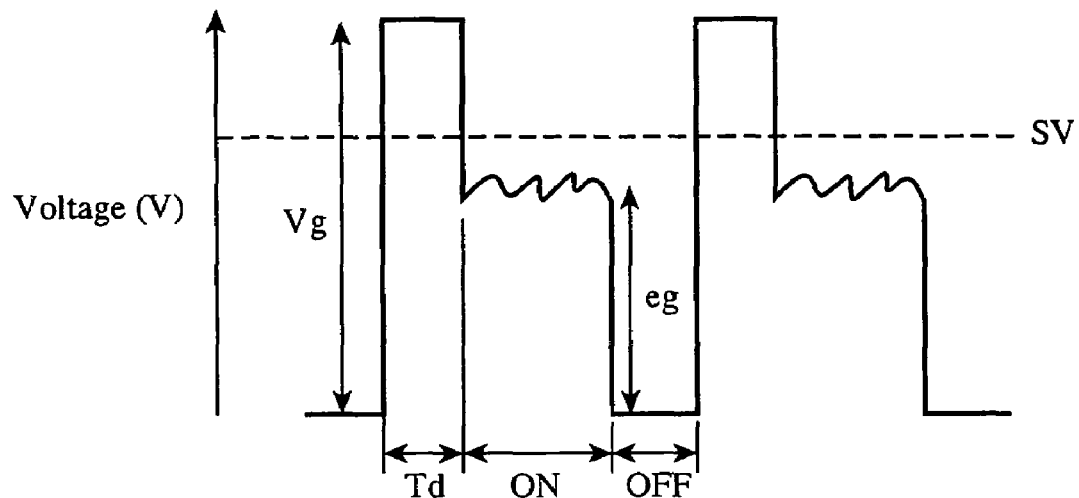
FIGS. 5(a) and 5(b) are waveform graphs showing a voltage waveform at the time of normal electric discharge and at the time of abnormal electric discharge, respectively.
Figure 5:
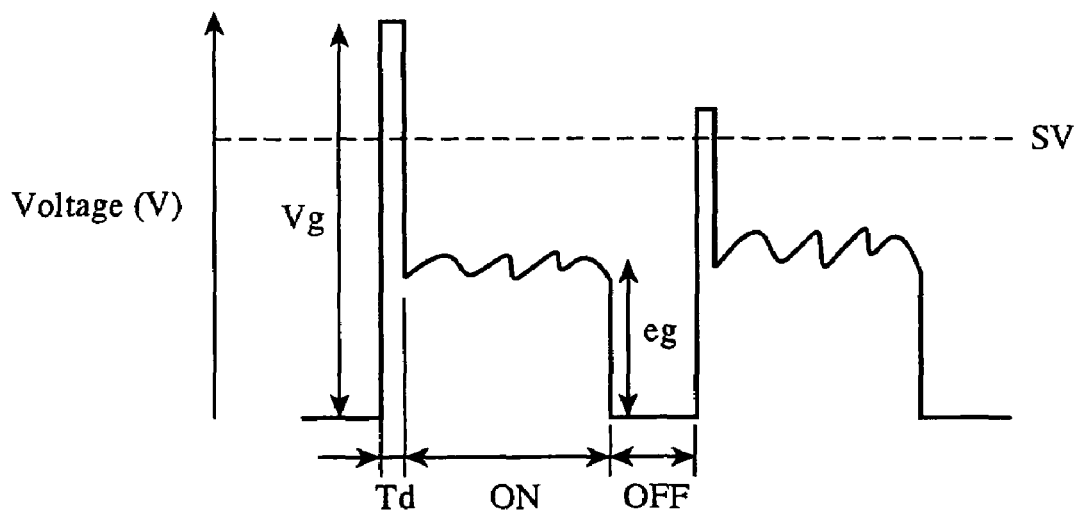

FIG. 4 is a flow chart showing a method for optimizing machining conditions of an electric discharge machine according to embodiment 1 of this invention. FIG. 5(*a*) is a waveform graph showing a voltage waveform at the time of normal electric discharge and FIG. 5(*b*) is a waveform graph showing a voltage waveform at the time of abnormal electric discharge.

Hereinafter, a method for optimizing machining conditions of an electric discharge machine will be described with reference to FIGS. 1, 4, and 5.

First, when the machining liquid 2 used in the machining tank 1 is a new machining liquid, the optimum machining condition computing unit 8 sets machining conditions depending on the new machining liquid, and when the machining liquid 2 is a machining liquid used last time, the optimum machining condition computing unit 8 sets the newest machining conditions used last time (step ST1). Here, machining conditions refer to discharging time, non-operating time, and a servo reference voltage, and the respective machining conditions can be obtained by reading those stored in the machining condition data base storing unit 9.

As shown in FIG. 5(*a*), the servo control unit 6 develops a set servo reference voltage SV in the servo unit 4 and controls a gap between the machining electrode 5 and the work 3 and applies a no-load voltage Vg to the machining electrode 5 to cause a dielectric breakdown in the machining liquid 2 between the machining electrode 5 and the work 3 after no-load discharging time Td, thereby developing electric discharge. The servo control unit 6 develops a discharge voltage eg and a discharge current Ip only for a set period of discharging time ON to melt and machine the work 3 by this discharge current Ip. Although machining chippings are produced when the work 3 is machined, the machining chippings are blown by the evaporation and explosion of machining liquid 2 in the process of being machined. As a result, the insulation of machining liquid 2 is decreased. However, the servo control unit 6 stops developing voltage only for a set non-operating time OFF to recover the insulation of machining liquid 2 and then again applies the no-load voltage Vg to the machining electrode 5.

The discharge voltage detecting unit 7 detects the discharge voltage eg at the time of machining and determines an average discharge voltage egav in a specified period of time (step ST2: discharge voltage detecting step).

In this kind of electric discharge machine for die-sinking, a circuit is designed in such a way as to make a discharge current Ip constant. Therefore, in a state where the machining liquid 2 is degraded to develop abnormal electric discharge as shown by a voltage waveform at the time of abnormal electric discharge in FIG. 5B, the volume resistivity R of machining liquid 2 is decreased and hence an average discharge voltage egav is decreased as is clear from the following relational equation (1).

$$egav[V/cm]=R \times Ip/(\text{machining gap}) \quad (1)$$

The optimum machining condition computing unit 8 determines, from the above-mentioned relational equation (1), a discharge current Ip that makes the average discharge voltage egav detected by the discharge voltage detecting unit 7 equal to an average discharge voltage when a new machining liquid is used (step ST 3: discharge current computing step). This discharge current Ip is determined, for example, in the following manner: an average discharge voltage and a discharge current when a new machining liquid is used are stored in the machining condition data base storing unit 9 and the discharge current Ip is determined from the fact that when the degradation of machining liquid 2 causes the average discharge voltage egav detected by the discharge voltage detecting unit 7 to decrease to $3/4$ times the average discharge voltage when the new machining liquid is used, the discharge current Ip that makes the detected average discharge voltage egav equal to the average discharge voltage when the new machining liquid is used becomes $4/3$ times the discharge current when the new machining liquid is used. In this regard, because the circuit is designed in such a way as to make the discharge current Ip constant, it is also recommended that the discharge current Ip be detected along with the average discharge voltage egav and that a discharge current be made $4/3$ times the detected discharge current Ip.

The optimum machining condition computing unit 8 determines optimum machining conditions from the discharge current Ip determined in the step ST 3 and the relational equations (2) to (4) derived from earnest study (step ST4: optimum machining condition computing step).

$$ON = A \times Ip - B$$

(where $A$ and $B$ are coefficients and $A=7$ to 10 and $B=1.0$ to 3.5) (2)

$$OFF = C \times EXP(D \times ON)$$

(where $C$ and $D$ are coefficients and $C=25$ to 35 and $D=0.01$ to 0.02) (3)

$$SV = E \times ON^{\wedge} - F$$

(where $E$ and $F$ are coefficients and $E=200$ to 250 and $F=0.2$ to 0.4) (4)

where ON is discharging time, OFF is non-operating time, SV is a servo reference voltage, Ip is a discharge current, and ^ represents power.

The above-mentioned relational equations (2) to (4) are stored in the machining condition data base storing unit 9 and the optimum machining condition computing unit 8 can determine optimum discharging time ON, optimum non-operating time OFF, and an optimum servo reference voltage SV.

Then, at the time of machining, the servo unit 4 and the machining electrode 5 are controlled under the determined optimum conditions by the servo control unit 6 and then it is examined whether or not three machining characteristics of machining speed, reduced consumption of a machining electrode, and work surface quality are satisfied, and when any one of three machining characteristics is not satisfied, the setting of optimum machining conditions is thought to be not adequate and hence the routine is returned to step ST2 where the optimization of machining conditions are again carried out. When all of three machining characteristics are satisfied, the optimizing of machining conditions is finished (step ST5).

Here, the computed machining conditions are written in succession over those stored in the machining condition data base storing unit 9 to store new machining conditions in preparation for a case where the same machining liquid is used in succession the next time.

As described above, according to the embodiment 1, it is possible to detect an average discharge voltage egav in a specified period of time, to compute a discharge current Ip that makes the detected average discharge voltage egav equal to the discharge voltage egav of a new machining liquid, to compute optimum machining conditions depending on the properties of machining liquid 2 by the computed discharge current Ip and the relational equations stored in the machining condition data base storing unit 9, and then to machine a work under the computed optimum machining conditions. As a result, it is possible to always obtain the highest machining characteristics that satisfy machining speed, reduced consumption of a machining electrode, and work surface quality regardless of the kind and the degree of degradation of a machining liquid.

Moreover, when the optimization of machining conditions shown in FIG. 4 is carried out in succession at intervals of a specified period of time, even if the properties of machining liquid vary with each passing hour, it is possible to always obtain the highest machining characteristics.

INDUSTRIAL APPLICABILITY

As described above, this invention is suitable for obtaining such a method for optimizing machining conditions of an electric discharge machine that provides the highest machining characteristics that satisfy machining speed, reduced consumption of a machining electrode, and work surface quality regardless of the kind and the degree of degradation of a machining liquid.

The invention claimed is:

1. A method for optimizing machining conditions of an electric discharge machine that a work to be machined is subjected to electric discharge machining by use of a machining liquid, the method comprising:
   detecting an average discharge voltage in a specified period of time at the time of electric discharge machining;
   determining a discharge current that makes a discharge voltage detected by the detecting equal to a discharge voltage when a new machining liquid is used, and the discharge current is determined based on relationships between a discharge voltage when the new machining liquid is used, a volume resistivity of the new machining liquid, and a discharge current of the new machining liquid; and determining discharging time, non-operating time, and a servo reference voltage, which depend on the discharge current determined by the determining the discharge current, from relationships between the discharge current, discharging time, non-operating time, and a servo reference voltage that establish optimum machining conditions.

2. The method for optimizing machining conditions of an electric discharge machine according to claim 1, wherein the optimum machining conditions are computed from relational equations, the relational equations including:

$$ON = A \times Ip - B,$$

$$OFF = C \times EXP(D \times ON), \text{ and}$$

$$SV = E \times ON\hat{\ } - F = E/ON^F,$$

wherein the ON is the discharging time, the OFF is the non-operating time, the SV is the servo reference voltage, the Ip is the discharge current, and the A, the B, the C, the D, the E, and the F are coefficients and ranges of application of the coefficients are A=7 to 10, B=1.0 to 3.5, C=25 to 35, D=0.01 to 0.02, E=200 to 250, and F=0.2 to 0.4, and wherein the symbol ˆ represents exponential power.

3. An electric discharge machine, comprising:

an electrode for machining, for performing electric discharge machining to a workpiece held in a machining liquid;

a servo for controlling a gap between the electrode for machining and the workpiece, and for applying a discharge voltage to the electrode for machining;

a servo control unit for sending a servo reference voltage to the servo;

a discharge voltage detecting unit connected between the electrode for machining and the workpiece, for detecting the discharge voltage at a time of electric discharge machining;

a machining condition database storing unit for storing the discharge voltage and a discharge current when a new machining liquid is used, a volume resistivity of the new machining liquid, and relational equations with the discharge current, a discharge time, a non-operating time, and the servo reference voltage that establish an optimum machining condition; and an optimum machining condition computing unit, connected to the discharge voltage detecting unit and the machining condition database storing unit, for computing the discharge current, the discharge time, the non-operating time and the servo reference voltage when the discharge voltage detected by the discharge voltage detecting unit at the time of electric discharge machining coincides with the discharge voltage in the case of using the new machining liquid by the relational equations, and for sending the discharge current, the discharge time, the non-operating time and the servo reference voltage to the servo control unit.

4. The electric discharge machine according to claim 3, wherein the relational equations with the discharge current, the discharge time, the non-operating time, and the servo reference voltage that establish the optimum machining condition include:

$$ON = A \times Ip - B,$$

$$OFF = C \times EXP(D \times ON), \text{ and}$$

$$SV = E \times ON\hat{\ } - F = E/ON^F,$$

wherein the ON is the discharging time, the OFF is the non-operating time, the SV is the servo reference voltage, the Ip is the discharge current, and the A, the B, the C, the D, the E, and the F are coefficients and ranges of application of the coefficients are A=7 to 10, B=1.0 to 3.5, C=25 to 35, D=0.01 to 0.02, E=200 to 250, and F 0.2 to 0.4, and wherein the symbol ˆ represents exponential power.

* * * * *